(12) United States Patent
Giese et al.

(10) Patent No.: US 8,379,624 B2
(45) Date of Patent: *Feb. 19, 2013

(54) TRANSPORT FOR WIRELESS RADIO ACCESS NETWORKS

(75) Inventors: Peter A Giese, Kinburn (CA); Stephane Roch, Gatineau (CA); Richard Thomas, Nepean (CA)

(73) Assignee: Apple Inc., Cupertino, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 12/825,300

(22) Filed: Jun. 28, 2010

(65) Prior Publication Data

US 2010/0265890 A1 Oct. 21, 2010

Related U.S. Application Data

(63) Continuation of application No. 10/321,481, filed on Dec. 18, 2002, now Pat. No. 7,768,993.

(60) Provisional application No. 60/352,702, filed on Jan. 28, 2002.

(51) Int. Cl.
*H04J 3/24* (2006.01)

(52) U.S. Cl. ........ 370/349; 370/310; 370/392; 370/466; 370/469; 370/471; 709/220

(58) Field of Classification Search .................. 370/310, 370/349, 389, 392, 465, 466, 467, 468, 469, 370/470, 471; 709/220

See application file for complete search history.

(56) References Cited

U.S. PATENT DOCUMENTS

| | | | |
|---|---|---|---|
| 5,841,764 A * | 11/1998 | Roderique et al. | 370/310 |
| 6,473,411 B1 | 10/2002 | Kumaki et al. | |
| 6,587,457 B1 | 7/2003 | Mikkonen | |
| 6,681,259 B1 | 1/2004 | Lemilainen et al. | |
| 6,744,783 B1 | 6/2004 | Tzeng | |
| 6,775,284 B1 | 8/2004 | Calvignac et al. | |
| 6,879,566 B1 | 4/2005 | Raivio et al. | |
| 7,263,089 B1 * | 8/2007 | Hans et al. | 370/349 |
| 2001/0025321 A1 * | 9/2001 | Tang et al. | 709/246 |
| 2003/0026240 A1 * | 2/2003 | Eyuboglu et al. | 370/349 |

* cited by examiner

*Primary Examiner* — Christopher Grey
(74) *Attorney, Agent, or Firm* — Meyertons, Hood, Kivlin, Kowert & Goetzel, P.C.

(57) ABSTRACT

A radio access network includes a transport network layer; a radio network layer having a layer 2 network for communicating between entities within the radio network layer by exchanging datagrams having a predetermined format used only within the radio network layer. Accordingly, the present invention provides for a true decoupling at layer 2 between the radio network layer and the transport network layer.
Addressing at layer 2 can enable both connectionless and connection oriented using an overlay connectivity model. Layer 2 in the radio network layer is implemented as an Ethernet network.

19 Claims, 11 Drawing Sheets

TRANSPORT FOR WIRELESS RADIO ACCESS NETWORKS

CROSS-REFERENCE TO RELATED APPLICATION

This application is a continuation of application Ser. No. 10/321,481, filed on Dec. 18, 2002, which claims the benefits of earlier filed provisional application No. 60/356,702, filed Feb. 13, 2002, the entire contents of which are hereby incorporated by reference for all purposes.

FIELD OF THE INVENTION

The present invention relates to transport for wireless radio access networks.

BACKGROUND OF THE INVENTION

FIG. 1 illustrates a known reference model for a radio access network (RAN). A base station controller/radio network controller (BSC/RNC) 10 is coupled to a plurality of wireless base station 12, 14, 16, 18 via a radio access network 20. The radio access network can be modeled as a radio network layer (RNL) 22 and a transport network layer 24 and three planes intersecting those layers, a radio network control plane 26, a transport network control plane 28 and a user plane 30. The network may be leased from a service provider (SP) or owned by the wireless service operator.

In operation, the transport network layer (TNL) receives a request from the RNL to establish a bi-directional transport bearer for datagram traffic. The request includes the end system address and transport bearer association received from the peer. It also includes the quality of service and resources required from the transport network. In summary it shall:

- Provide unique connection identifiers such that individual flows can be uniquely addressed for both user plane as well as control plane (eg VPI, VCI, CID in AAL2/ATM);
- Provide in-sequence delivery of PDUs to upper layers;
- Support sending coordinated dedicated channels (DCHs) multiplexed onto the same transport bearer (i.e., frame multiplexing, e.g. AAL2/ATM);
- Provide proper mappings of required RNL bearer channels QoS to TNL resources (eg AALx in ATM); Provide transport signalling protocol used to setup and tear down transport bearers (eg ALCAP in 3GPP r3);
- Provide segmentation and re-assembly mechanism in order to fit to the maximum PDU size (i.e., R3 ATM AAL2 SSSAR layer function);

FIG. 2 illustrates a known RAN network system model. The RAN network system model includes the wireless base station controller 10, the wireless base station 12 and an intervening transport network (TRAN) 40. The TRAN 40 includes points of attachment (PoA) 42 and 44 and intranetwork switching collectively represented by function block 46. For the system model of FIG. 2 the current network connectivity model is a peering model. For the peering model: User traffic is "peered" with Service Provider's network at point of attachment (PoA) via rudimentary/sophisticated User Network Interface (UNI). In this model, user quality of service (QoS) requirements are snooped by the SP or signaled from user to the SP (via the UNI interface) in order to satisfy required QoS guarantees.

Consequently wireless datagrams need to be processed by both wireless end points and SP TRAN equipment. This means all sub-systems need to have common understanding of: QoS information, Signaling capabilities and Flow segregation ID across PoA. The known RNL peering connectivity model imposes upon the TNL the need to also implement a peering connection-oriented model; current implementations of datagram addressing are peering-like, coupling RNL 22 (DCH-ID, etc) and TNL 24 (AAL2 CID, etc) identifiers.

Emerging connectionless protocols, such as IP are being proposed as the new TNL transport mechanism and will have to meet connection-oriented requirements In order to use connectionless IP, development of mechanisms to offer connection-oriented capabilities to wireless TNL layer needs to take place.

SUMMARY OF THE INVENTION

An object of the present invention is to provide an improved transport for wireless radio access networks.

In accordance with an aspect of the present invention there is provided a method of operating a radio access network comprising: establishing a radio network layer; establishing a transport network layer; and communicating between entities within the radio network layer by exchanging datagrams having a predetermined format used only within the radio network layer.

In accordance with an aspect of the present invention there is provided a radio access network comprising: a transport network layer; a radio network layer including a layer 2 network for communicating between entities within the radio network layer by exchanging datagrams having a predetermined format used only within the radio network layer.

Accordingly, the present invention provides for a true decoupling at layer 2 between the radio network layer and the transport network layer.

In accordance with an aspect of the present invention a method of processing layer 2 datagrams within RNL is provided that facilitate decoupling thereof.

Addressing at layer 2 can enable both connectionless and connection oriented using an overlay connectivity model

BRIEF DESCRIPTION OF THE DRAWINGS

The present invention will be further understood from the following detailed description with reference to the drawings in which.

DETAILED DESCRIPTION OF THE PREFERRED EMBODIMENT

Figure 1:
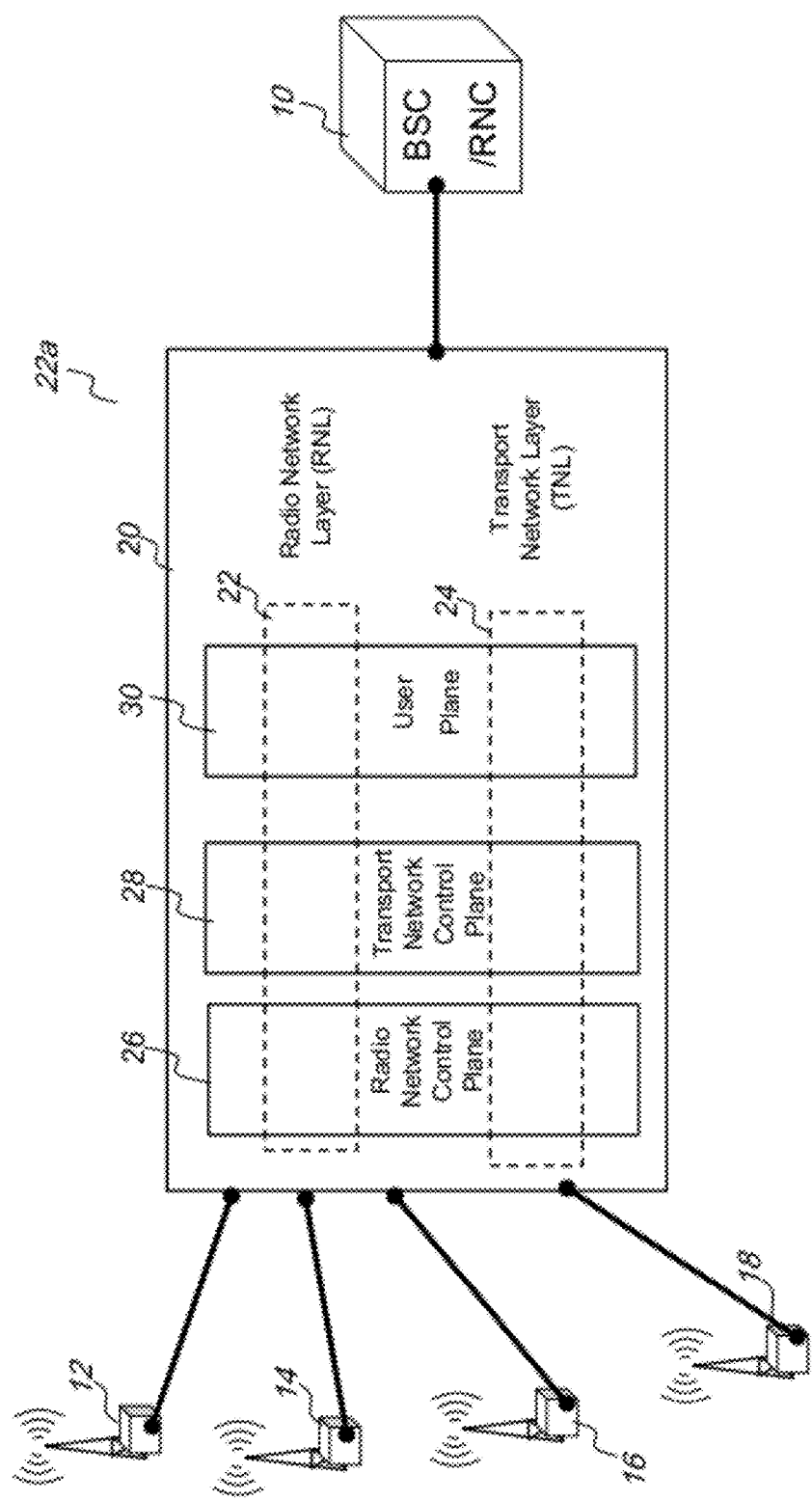
FIG. 1 illustrates in a block diagram a known reference model for a radio access network (RAN)
Figure 2:
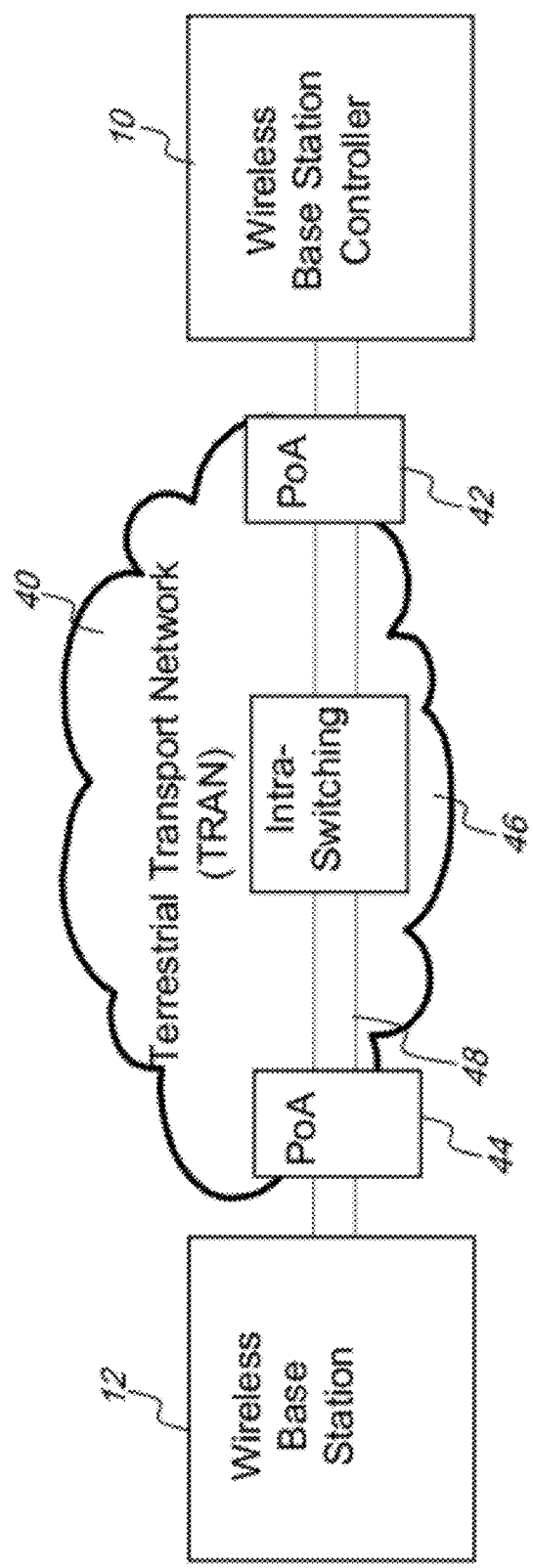
FIG. 2 illustrates in a block diagram a known RAN system model.

Referring to FIG. 2, there is illustrated in a block diagram a known RAN system model implemented in an overlay model in accordance with an embodiment of the present invention.

For the overlay model: User datagram requirements are much simplified. The service provider (SP) offers quality of service (QoS) guarantees as part of the service in a point-to-point or point-to-multipoint (via Dedicated or Virtual Private Line service framework). Hence, the user datagram does not need to carry any flow segregation ID peering with SP, nor does it need to offer any signaling capability, nor any QoS information as the service leased corresponds to common denominator user flows characteristics, i.e. highest QoS.

Consequently, datagrams processed by wireless can be totally independent from SP TRAN datagram processing functions enabled via PoA edge translation (physical port-based mapping): This means each point of attachment (PoA) 42 and 44 provides an operational independence of: QoS, signaling and flow segregation technologies.

The wireless base station controller 10 and wireless base station 12 include wireless radio frames computing platforms. Host systems intercommunicate using either L2 frames or L3 packets as datagrams.

The network points of attachment (POA) 42 and 44 either map wireless datagrams into lower layer transport services (examples: DSx, STSx, OCs for dedicated PL) or actively switches the datagrams (examples: Ethernet Switching, MPLS, IP routing for virtual PL).

The transport provided by the TRAN 40, as represented by a pipe 48 provides physical port-based, point-to-point flow of datagrams over dedicated or virtual Ethernet private line sessions with a specific service level agreement (SLA).

Intra-switches as represented by the block 46 provides backhaul networking intra-switching (examples are: TDM switched, SONET/SDH Ring or Meshed networks).

The cellular terrestrial radio access network (TRAN) 40, typically uses private addressing space (examples, A/Z PL, IPV4/6, Ethernet Mac).

Figure 3:
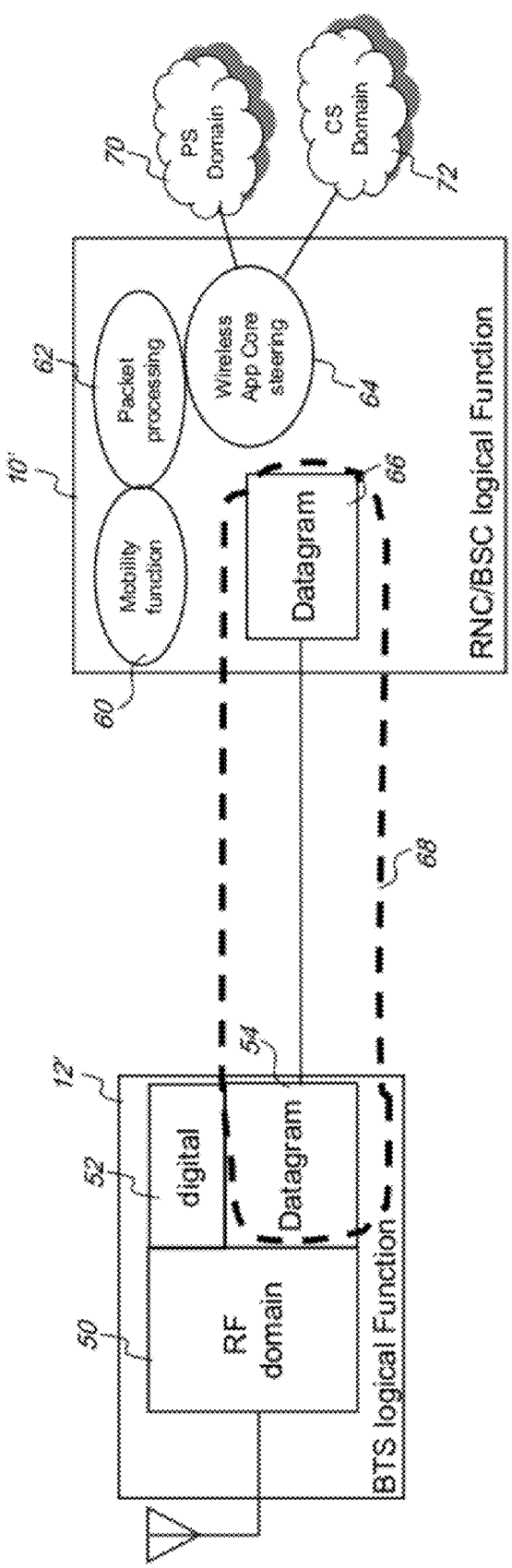
FIG. 3 illustrates in a functional block diagram a wireless base station and a base station controller communicating via a datagram service in accordance with an embodiment of the present invention.

Referring to FIG. 3, there is illustrated in a functional block diagram a wireless base station and a base station controller communicating via a datagram service in accordance with an embodiment of the present invention. The base station function block 12' includes a radio frequency domain 50, a digital domain 52 and a datagram service 54. The base station controller function block 10' includes a mobility function 60, a packet processing function 62, a wireless application core steering 64 and a datagram service 66. A datagram is an independent, self-contained message sent over the network whose arrival, arrival time, and content integrity guarantees are assured by network service and not by the datagram protocol capabilities. Datagrams can be either wireless radio frames or OA&M signals.

Figures 4A, 4B:
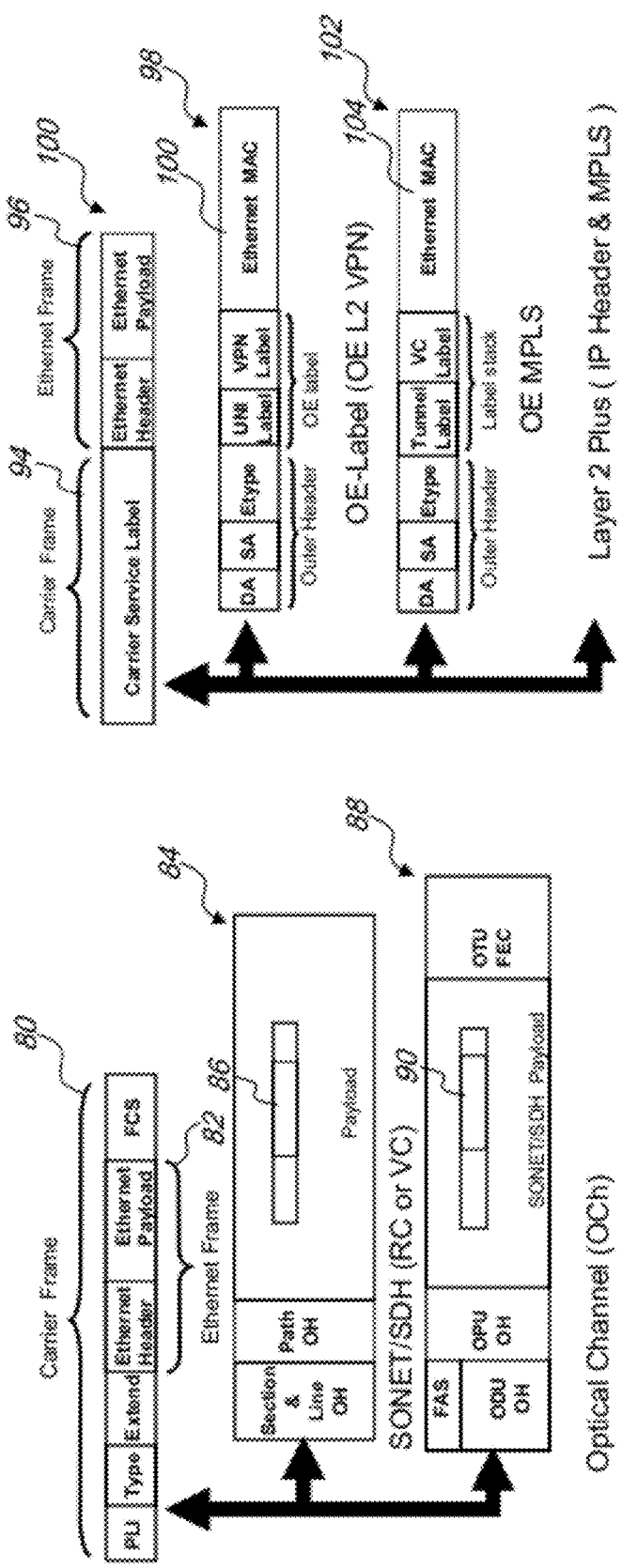
FIGS. 4a and 4b illustrates in block diagrams transport options for the datagram service of FIG. 3.

Referring to FIGS. 4a and 4b, there are illustrated in block diagrams transport options for the datagram service of FIG. 3. Behind the POA-edge (42 and 44), once the traffic is encapsulated, the carrier is free to use the most economic L1, L2, L3 switching fabric that provides desired SLA. The embodiments of the present invention are based on an overlay network system design, enabling carrier providers to operate TRAN (40) networks independent of wireless operator's equipment (10 & 12). FIG. 4a illustrates how a carrier frame 80 having an embedded Ethernet frame 82 can be transported using SONET 84 as payload 86 or optical channels 88 as payload 90. FIG. 4b illustrates how carrier frame 94 and Ethernet frame 96 are combined to form a frame 97, where the optical Ethernet label 98 includes an Ethernet MAC adding 100 and where the optical Ethernet MPLS label 102 includes the Ethernet MAC address 104.

Figure 5:
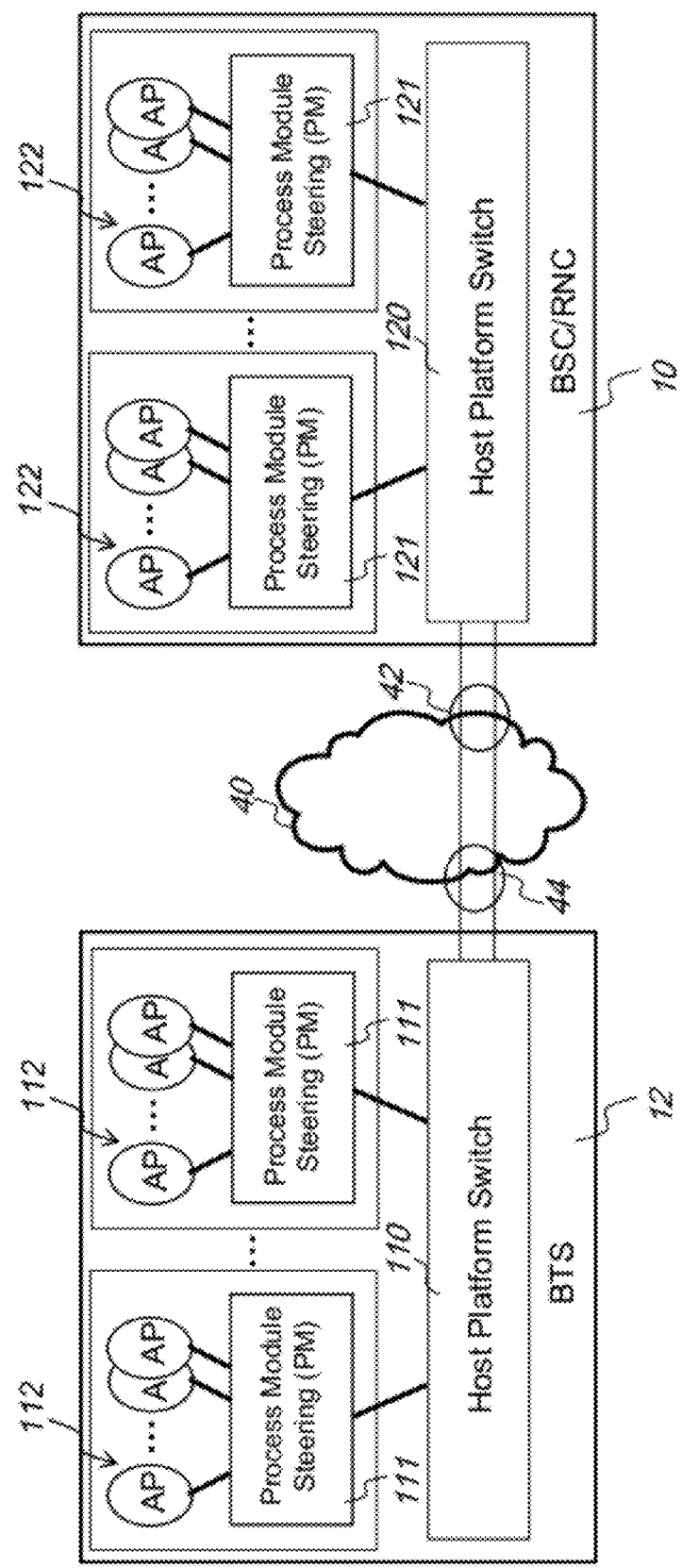
FIG. 5 illustrates in a block diagram the main functional components of the wireless base station and the base station controller of FIG. 3.

Referring to FIG. 5, there is illustrated in a block diagram the main hardware components of the wireless base station and the base station controller of FIG. 3.

The base station 12 includes a host platform switch 110, a plurality of process modules 111 each having a plurality of application processes (AP) 112. Similarly the base station controller 10 includes a host platform switch 120, a plurality of process modules 121 each having a plurality of application processes (AP) 122.

The application processes include radio modems, RLC & RRL S/W. Radio PDU may or may not contain AP-ID information for necessary for flow steering function performed at PM level 111 and 121 (second tier address options)

Each process module 112, 122 has a single Ethernet MAC address (OUI=0). A simple packet steering function is performed by the PM 112, 122 in order to send PDU to individual AP 112, 122 (2 second tier address options)

Host platform switches 110 and 120 are Ethernet switching points that do not possess Ethernet MAC addresses (except for OAM&P agent, etc) as it performs layer-2 bridging algorithm. A direct 1:1 PM address and Host Switch port mapping is used for design simplicity.

For dedicated Ethernet private line the inter-host frame walk through is as follows: AP 112, 122 are identified by STA (second tier address). PM 111, 121 have a single Ethernet MAC address. PM frame steering function is based on STA information. There is simple 1:1 relationship between Host Switch 110, 120 port and PM 112, 122 MAC address. Host switches frames based on FTA address information (i.e. Ethernet DA and SA) where a forwarding decision is based on destination address (DA) MAC/egress Port and learning tables that are populated via source addresses (SA) MAC/ingress Port information;

Host Switch 110 forwards frames to PoA 44 using PM DA MAC address information. TNL 40 simply encapsulates user flow with no regard of user address/QoS information as service is offered on dedicated port basis (non shared). Private Ethernet addressing space enables wireless operator to assign any type of networking identifier (examples: URL, IP, MPLS/LSP, ATM VP/VC, L2 Macs).

The overlay TNL network 40 point of attachment 40, 44 forwarding is based on dedicated physical or virtual port mapping (examples DSx, STSx, LSP).

AP 112, 122 addresses are mapped to Ethernet FTA & STA address space. Ethernet FTA can be learned or manually provisioned at AP driver interface. If automatically provisioned, Ethernet DA MAC addresses can utilize standard registration protocol (ie GARP, GVRP, or even other simpler methods).

The simple method referred here aims at leveraging the simple 802.1D bridging algorithm where MAC addresses are learned and aged out as a fundamental behaviour that can be exploited for end-host Ethernet MAC address discovery and thus simplify tremendously the software investment on each nodal system to perform such a task at boot time. The highlights are as follows:

1) end host (e.g. BTS) that needs to discover the other end host(s) (e.g. BSC/RNC) can simply issue from the AP a specially VLAN-tagged broadcast packet to network (e.g. backhaul).
2) This special VLAN-tagged broadcast (or VLAN-contained broadcast) restricts ENET pollution to only VLAN-aware switches and registered end-host MAC station. It also requires all ENET switch along the path to be VLAN-capable.
3) Once the other host receives that special VLAN-tagged broadcast frame, it responds by issuing a Unicast back to the sender.
4) Once sender receives the unicast frame, the process is over as both end hosts now has both respective destination MAC address for remaining of datagram exchange.

Inter-Host Frame Walkthrough Over EPL Service Framework:

AP <-> PM

APs are identified by STA 148 (second tier address). PM have single Ethernet MAC address. PM datagram steering function performed by host switch is based on FTA information 146.

PM <-> Host

There is simple 1:1 relationship between Host Switch port and PM MAC address. Host switches frames based on FTA address information where forwarding decision is based on DA MAC/egress Port and learning tables are populated via SA MAC/ingress Port information;

Host <-> PoA

Host Switch 110 forwards frames to PoA 44 using PM 110 DA MAC address information 146. TNL 40 simply encapsulates user flow with no regard of user address/QoS information as service is offered on dedicated port basis (non shared). Private Ethernet addressing space enables wireless operator to assign any type of networking identifier (examples: URL, IP, MPLS/LSP, VLAN tags, L2 Macs).

TNL Overlay

TNL 40 Network point of attachment forwarding based on dedicated physical or virtual port mapping (examples Label insertion, MPLS-like, Martini, etc). QoS traffic management is implemented based on queuing model where statistical multiplexing is possible.

End Points Address Determination

Figure 7:
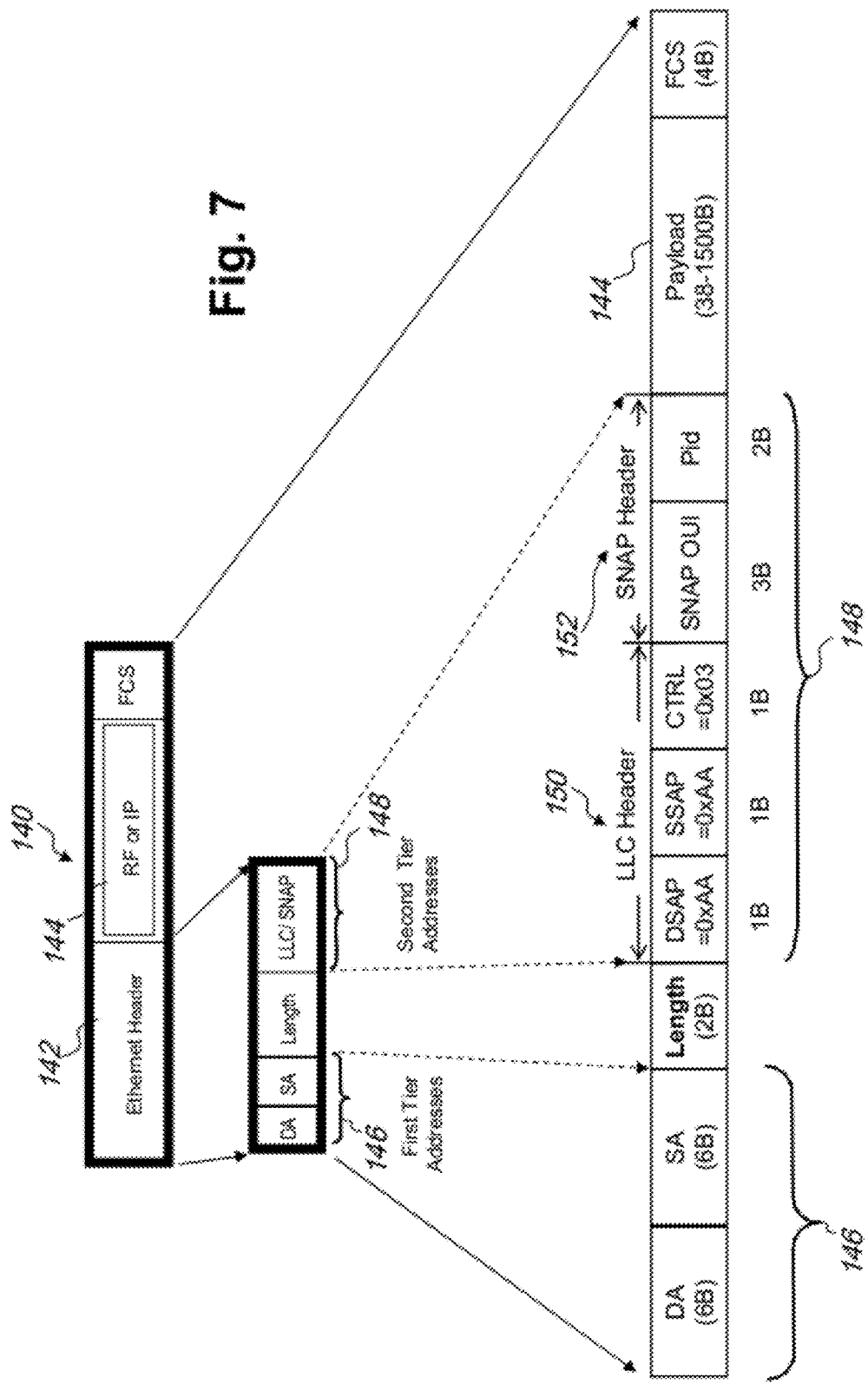
FIG. 7 illustrates Ethernet encapsulation for the datagram service for length encapsulation.
Figure 8:
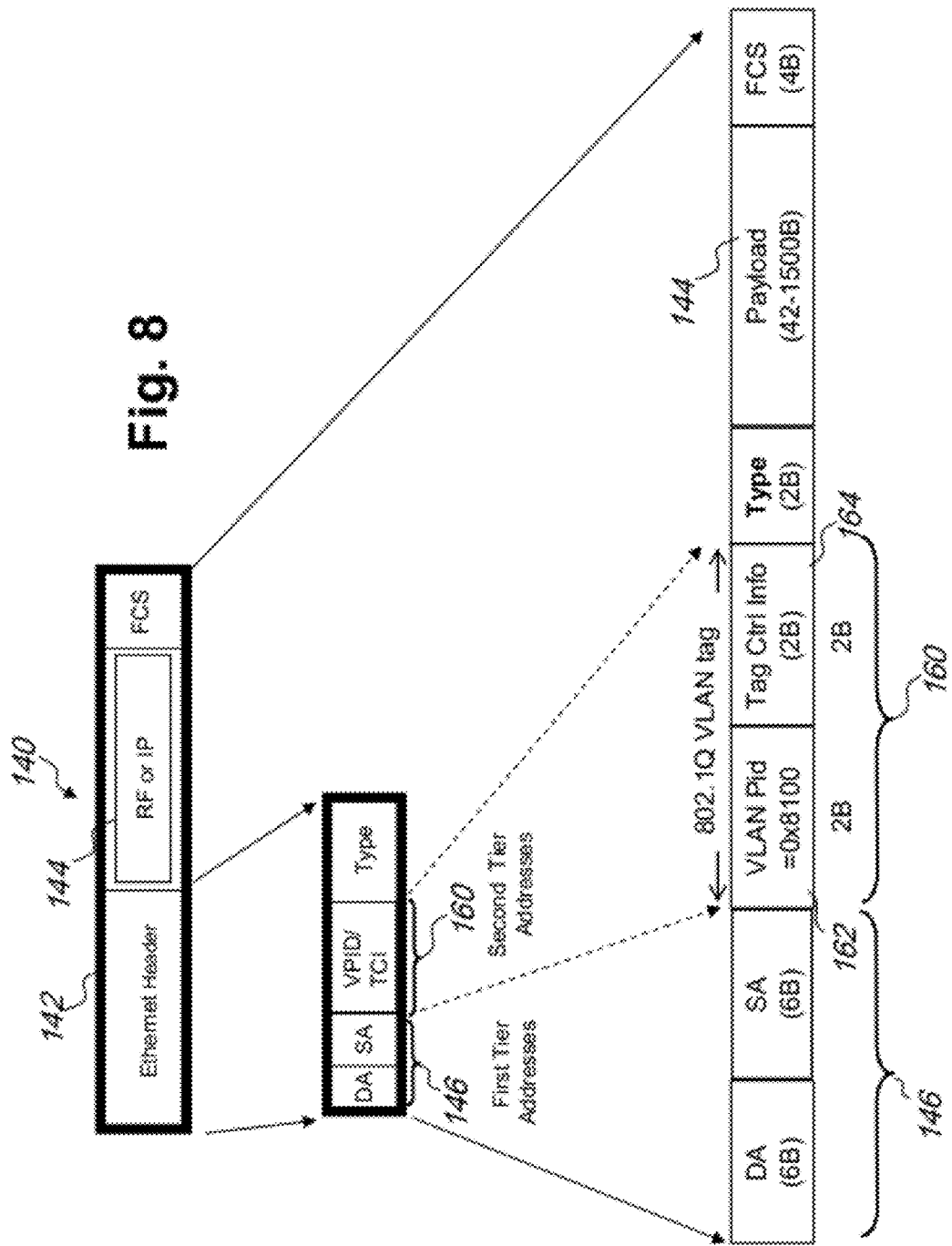
FIG. 8 illustrates Ethernet encapsulation for the datagram service for type encapsulation.

AP addresses are mapped to Ethernet FTA & STA address space (see FIGS. 7 & 8). Ethernet FTA can be learned or manually provisioned at AP driver interface. If automatically provisioned, Ethernet DA MAC addresses can utilize standard registration protocol (i.e. GARP, GVRP, or even other simpler methods) as described herein above.

Figure 6:
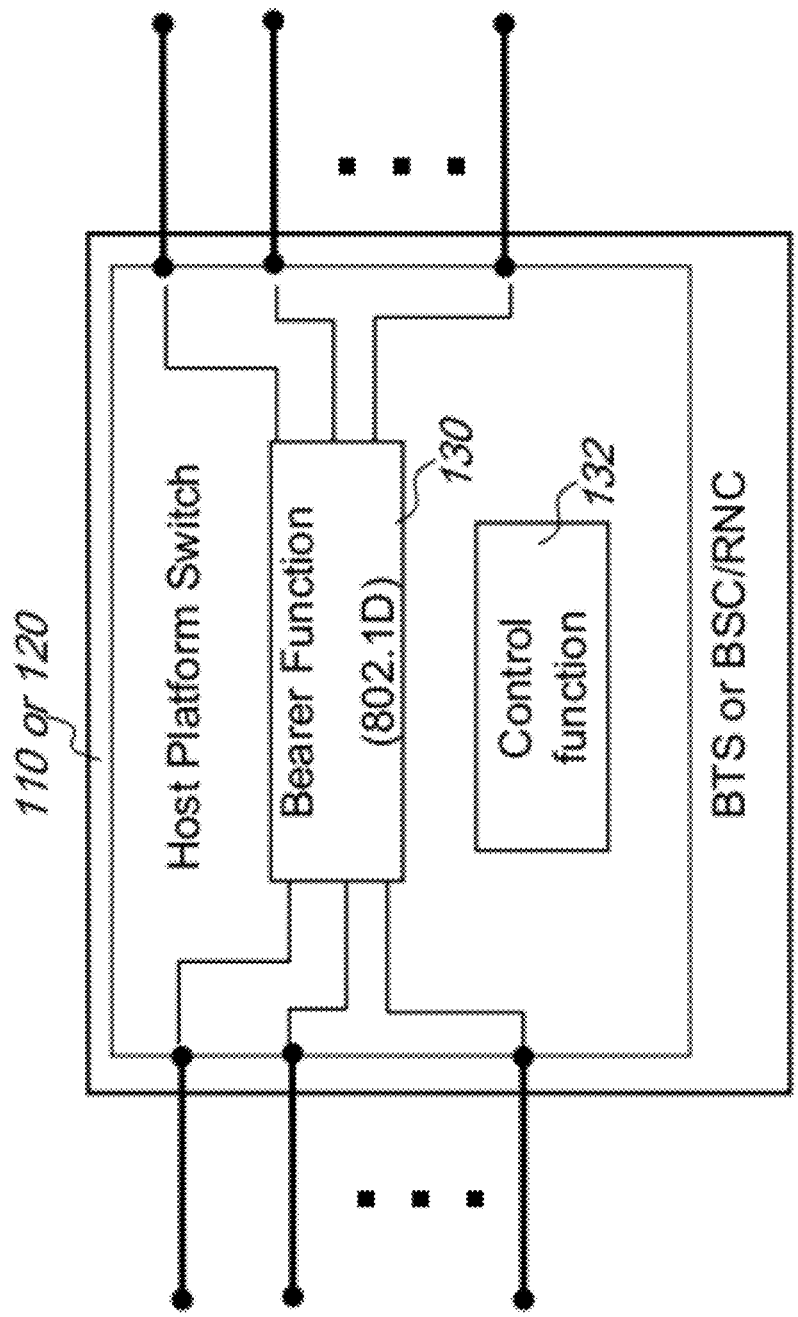
FIG. 6 illustrates the functional components of the host platform switch of FIG. 5 in further detail.

Referring to FIG. 6 shows functional components of the host platform switch of FIG. 5 in further detail. The host platform switch has an Ethernet address, a bearer function 130 which performs the 802.1D forwarding algorithm, and a control function 132 which requires an Ethernet & IP addresses to terminate host management house keeping tasks. Binding of Host Ethernet address with higher host-level provisioned address, such as IP address or URLs, can be accomplished by ARP or DHCP-like procedures.

Referring to FIG. 7, there is illustrated ethernet encapsulation for the datagram service for length encapsulation. Wireless datagrams for Mobile customer traffic (examples: direct radio frames (RFP) or RFP/AAL2/ATM or RFP/BCN, etc), as well as wireless host IP OA&M & control datagrams are encapsulated as Ethernet payloads 144.

One or many wireless datagrams can be encapsulated (co-ordinated DCHs over single transport bearer*)

For 802.3 Ethernet Length Encapsulation the first tier address 146 includes 12 Bytes (2×48-bit) Destination & Source MAC are used as first tier address (FTA) 146, and a second tier address 148 (STA) that is 8 Bytes total that contains a fixed LLC Header 150 [(3B) (DSAP=0xAA, SSAP=0xAA, Ctrl=0x03)] & SNAP Header 152 (5B) available for second tier address. The SNAP header 152 contains SNAP OUI (3B) and SNAP Pid (2B).

Intra-Host Ethernet Length STA Walk Through:

Host <-> PM

There is 1:1 relationship between Host Switch port and PM MAC address. Host switches frames based on FTA address information 146 where forwarding decision is based on DA MAC/egress Port and learning tables are populated via SA MAC/ingress Port information.

PM <-> Host

APs are identified by STA (148 second tier address). PM have single Ethernet MAC address. PM frame steering function is based on STA SNAP Header address 152 information, (i.e. fixed LLC header 150 fixed to DSAP=0xAA, SSAP=0xAA, Ctrl=0x03+SNAP header (5B-152). When using the Length encapsulation, the 2 bytes 154 following the SA field represent the actual length of data payload. The LLC being fixed, the SNAP OUI & SNAP Pid can be used (Pid=$2^{16}$ available address space) to address higher-layer protocol (e.g. application).

Referring to FIG. 8, there is illustrated Ethernet encapsulation for the datagram service for type encapsulation.

802.3 Ethernet Type Encapsulation:

12 Bytes Destination & Source MAC are used as first tier address (FTA)

4 Bytes VLAN tags (VPID & TCI) are available for second tier address (STA)

Intra-Host Ethernet Type STA Walkthrough

Host <-> PM

There is 1:1 relationship between Host Switch port and PM MAC address. Host switches frames based on FTA address information 146 where forwarding decision is based on DA MAC/egress Port and learning tables are populated via SA MAC/ingress Port information;

PM <-> Host

APs are identified by STA (160 second tier address). PM have single Ethernet MAC address. PM frame steering function is based on STA 802.1Q VLAN tag information 160. When using the Type encapsulation, the 2 bytes 162 following the SA field identifies the nature of the client protocol running above Ethernet (e.g. IP uses Type field=0x0800). AP identification and steering is done via Tag Control Information (TCI) 164 field which contains 3-bits for QoS priority, 1 bit for control and remaining 12 bits for VLAN-ID, thus $2^{12}$=4096 available addressable space to address higher-layer protocol (e.g. applications).

Figure 9:
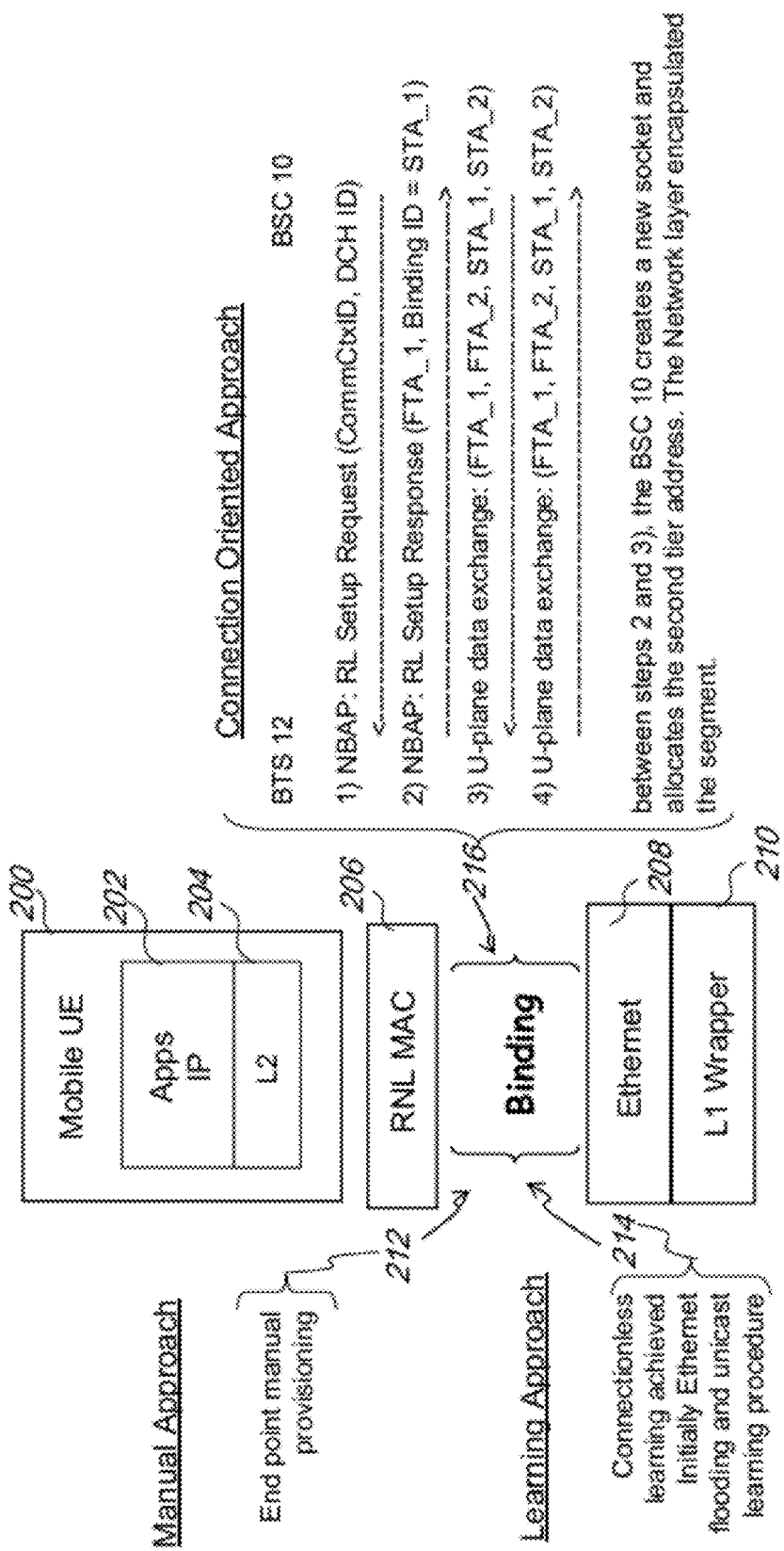
FIG. 9 illustrates in a functional block diagram second tier address assignment in accordance with an embodiment of the present invention.

Referring to FIG. 9, there is illustrated in a functional block diagram second tier address assignment in accordance with an embodiment of the present invention A mobile terminal user entity 200 having an application layer 202 and an L2 204 becomes associated with a base station 12 having a radio network layer 22 RNL MAC layer 206. The RNL MAC layer 206 needs to be bound to the Ethernet 208, which makes use of a L1 wrapper 210.

Figure 10:
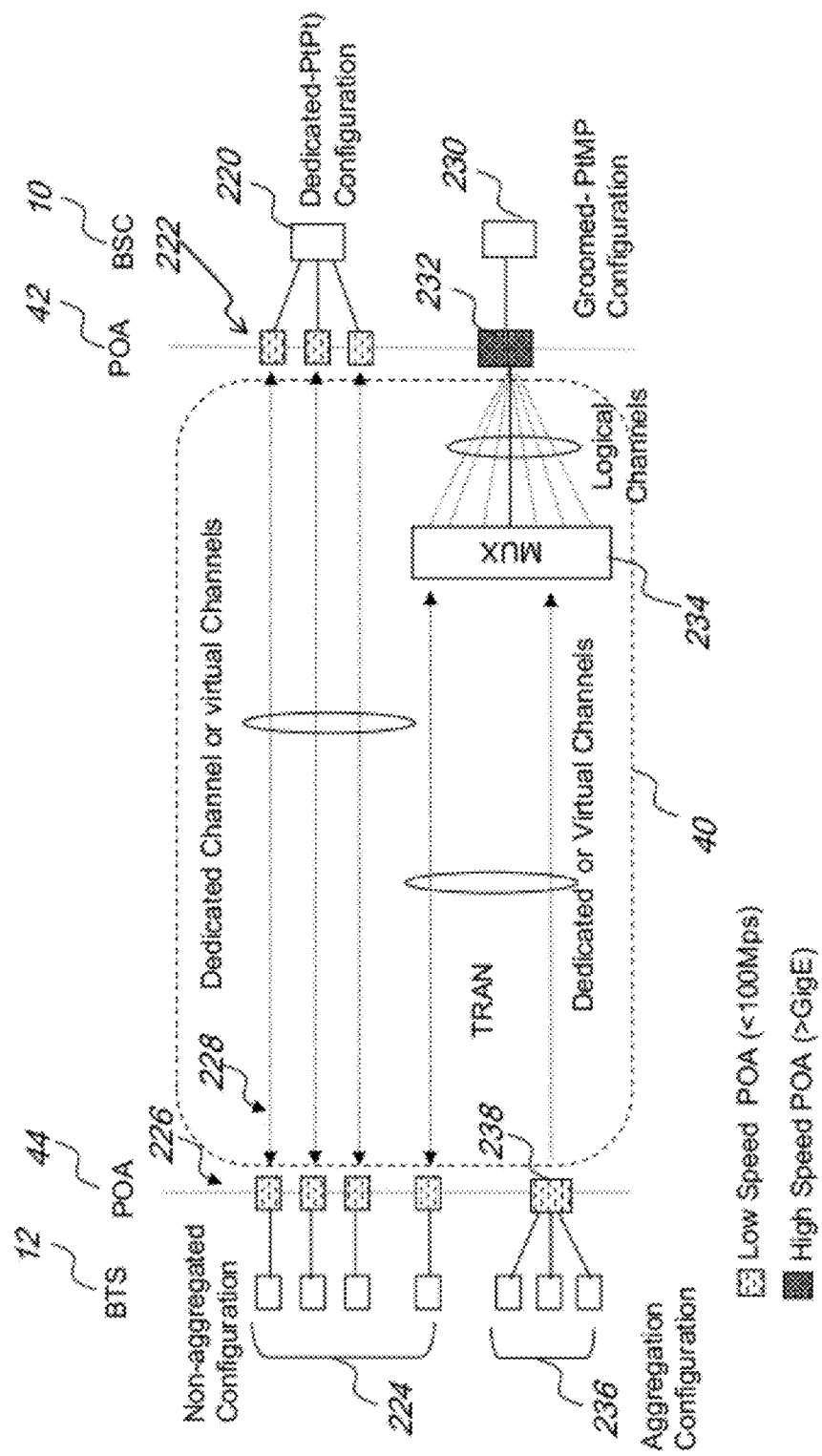
FIG. 10 illustrates in a block diagram various point of attachment operational configurations possible using the datagram service of FIG. 3.

For second tier address (STA) assignment there are three possible methods. Endpoints for end-to-end datagram communication are uniquely identified by FTA and STA. STA can be assigned by a manual 212, learning 214 or connection oriented 216 procedures. RNL link setup signaling can be used to manage Host & Port address, that is, from an architectural perspective one does not have to rely on the existence of UDP/IP stack Referring to FIG. 10, there is illustrated in a block diagram various point of attachment operational configurations possible using the datagram service of FIG. 3.

POA Operational Configurations—Dedicated-PtPt & Groomed-PtMP

224 One POA 44 is connected to only one BTS 12, with one port appearance on the BTS 12 HPS 110. This is applicable to both configurations 220 and 230.

220 One POA 42 port appearance on BSC 10 HPS 20 for each BTS 12.

236 One POA 44 connected to more than one BTS 12, with one port appearance on each BTS HPS 10. This is applicable to both configurations 220 and 230.

230 One POA 42 is connected to only one BSC 10, with one port appearance on BSC HPS 20 for more than one BTS 12.

POA Interface Addressing & Management

For 22, 236 all TRAN traffic passing through the POA 228, 238 is steered to the customer facing port (BTS 12 or BSC 10). All Ethernet first tiered addresses 146 receive the same steering treatment to the customer port. Second tiered addresses are not processed by the POA. The steering function is manually provisioned at startup and does not change.

For 220, all TRAN traffic passing through the POA 222 is steered to the corresponding BTS based on Ethernet first tiered addresses 146. Second tiered addresses are not processed by the POA.

Steering function is manually provisioned or realized through an Ethernet learned/auto discovery process, as described with regard to FIG. 2.

Optional UNI signaled be applied for all BTS groomed traffic (logical channels) flowing over the high speed medium using second tiered addresses.

Embodiments of the present invention embrace an overlay model that enables TRAN POA-to-POA addressing to be independent from wireless equipment addressing. Addressing within the TRAN can be accomplished two different ways:

A dedicated Ethernet Private line tunnel where the TRAN network 40 is used to tunnel traffic between two POAs 42 and 44.

A Virtual Ethernet switched service where the TRAN network 40 operates like a distributed Ethernet switch between POAs 42 and 44.

In both cases the TRAN wireless traffic is encapsulated using any Layer 1, Layer 2, or Layer 3 networking scheme. Embodiments of the present invention described herein have emphasized an all Ethernet layer 2 approach, however the architecture foundation of the all Ethernet approach does not exclude encapsulating Ethernet frames at POAs 42 and 44 using either IP or SONET techniques. TRAN addressing scheme between POA can be any techniques; using one or both FTA and STAs methods. The only requirement is that TRAN FTA and STAs remain independent of encapsulated wireless equipment FTA and STAs.

Figure 11:
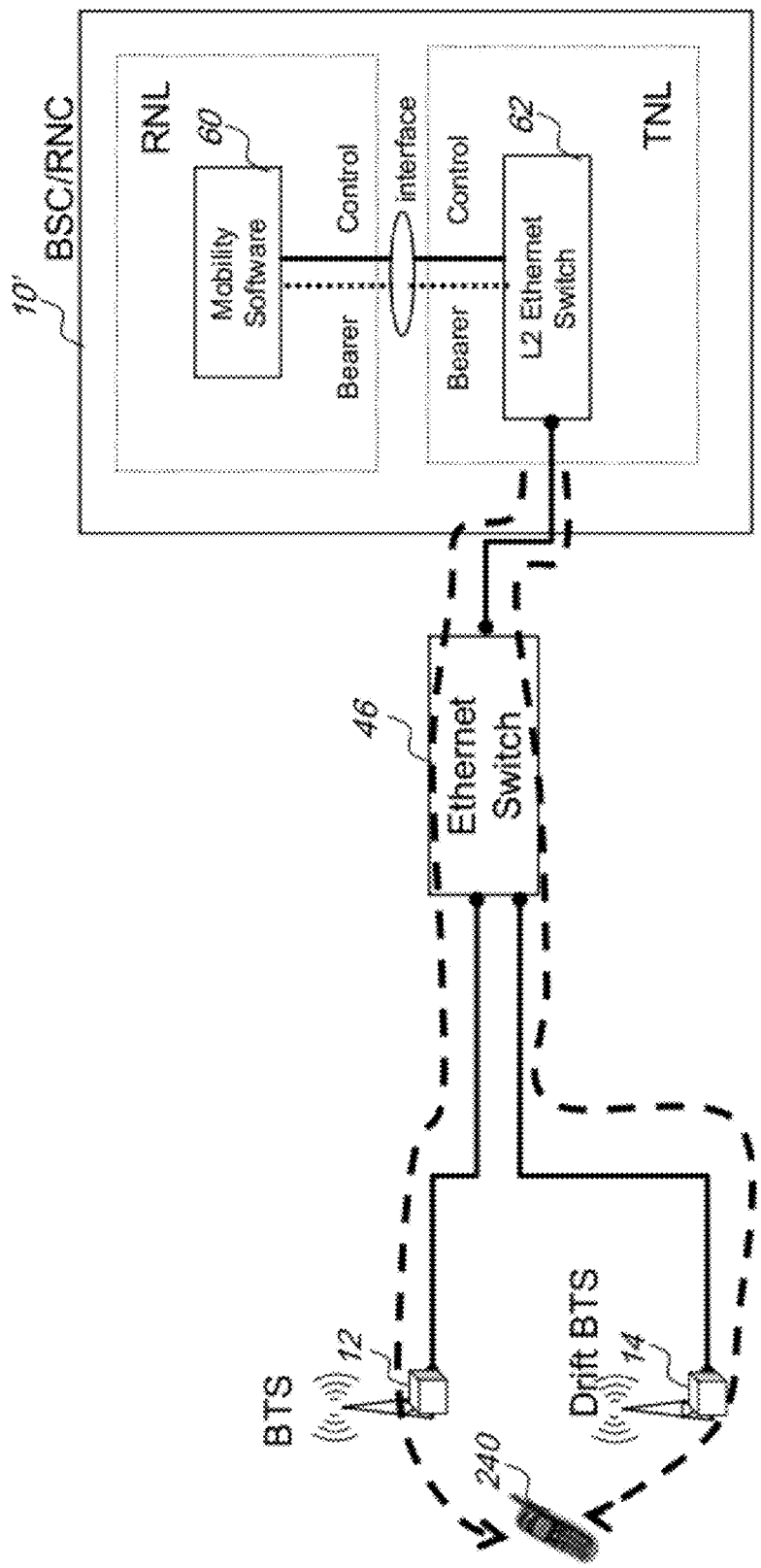
FIG. 11 illustrates in a block diagram how a soft hand-off is handled using the datagram service of FIG. 3.

Referring to FIG. 11, there is illustrated in a block diagram how a soft hand-off is handled using the datagram service of FIG. 3. For simplicity the TRAN 40 is represented by an Ethernet switch 46. The process for a downlink TNL multicast (Soft Hand-Off) is illustrated.

Today's RNL (RLC, etc) needs to perform packet duplication while in soft hand of mode.

An Ethernet-switched TNL offers integrated multicast capabilities where only objects needs to be exchanged between the BSC 10 and BTS 10 and BTS 12 ($DCH_{source}$, $BTS\text{-}ID_1$, $BTS\text{-}ID_n$, Event-ID).

If the Type STA option of FIG. 7 is used two methods is possible:

GARP signaling events triggered at power measurement messages passing a threshold value invoking soft-hand off operation of drift-BTS 14. This results in GARP registration exchange for all BTS participating in soft-hand off operation. GARP tear-down triggered by power measurement going below a threshold forcing to leave multicast. This method needs the creation of new GARP multicast address specific for wireless multicast soft hand-off application.

Use VLAN registration during soft hand off scenario where contained frame broadcast is performed inside VLAN paths only (VLAN-contained broadcast). Here GVRP is used as part of registration/removal exchange.

GLOSSARY

AP=wireless application process. That's usually physically instantiated at silicon/silicon island level but abstraction boundary can be extended up to board packaging level.

PM=Process Module. Includes many AP processes. Typically physically instantiated at the board level but abstraction boundary can be extended up to shelves and frame packaging level.

Host=Platform addressable entity. Include several PMs. Typically physically instantiated at the shelf level but abstraction boundary can be extended up to set of shelves and/or frame packaging level.

Frame=layer 2 protocol information definition (eg ATM, Ethernet, FR, PPP, etc). Data link addressing visibility and link error detection done on a per hop/segment basis;

Packet=Layer 3 protocol information definition (eg IP, IPX, etc). Network layer where addressing visibility is beyond hop/segment subnet.

STA=Second Tier Address component

FTA=First Tier Address component

RFP=Radio Frame Protocol

ALCAP=Generic name for the transport signalling protocols used to set-up and tear-down transport bearers EPL=Ethernet Private Line service;

D-EPL=Dedicated Ethernet Private Line service. Not statistical multiplexing occurs and usually maps onto dedicated circuits (eg DSx/STx, etc);

V-EPL=Virtual Ethernet Private Line service. Statistical multiplexing benefits exists applying QoS traffic management principles over queuing model;

HPS=Host Platform Switch.

What is claimed is:

1. A method of operating a radio access network, the radio access network comprising a radio network layer and a transport network layer, the method comprising:

running an application process executed in a process module in the radio network layer;

the application process generating a radio datagram;

encapsulating the radio datagram in a payload of a second datagram, the second datagram having a header and the payload, the header having a first tier address (FTA) and a second tier address (STA), the STA being used only within the radio network layer and identifying the application process;

transmitting the second datagram to a host switch by the process module; and switching the second datagram to a point of attachment (PoA) based on the FTA, the PoA being part of a terrestrial transport network;

wherein an addressing scheme of the terrestrial transport network is independent of the STA.

2. The method as claimed in claim 1, further comprising:
receiving at the host switch a third datagram from the PoA, the third datagram having the FTA and the STA;
forwarding the third datagram based on the FTA to the process module; and
steering the third datagram at the process module to the application process based on the STA.

3. The method as claimed in claim 1, wherein the second datagram is an Ethernet packet.

4. The method as claimed in claim 1, further comprising: forwarding the second datagram on a dedicated physical mapping in the terrestrial transport network.

5. The method as claimed in claim 1, further comprising: forwarding the second datagram on a virtual mapping in the terrestrial transport network.

6. The method as claimed in claim 1, further comprising: provisioning the STA manually.

7. The method as claimed in claim 1, further comprising the step of: provisioning the STA through unicast learning.

8. The method as claimed in claim 1, wherein the STA is provisioned through a connection-oriented approach.

9. The method as claimed in claim 3, wherein the STA includes a VLAN tag, and wherein the STA comprises a field used in the VLAN tag.

10. The method as claimed in claim 3, wherein the STA includes a SNAP header and wherein the STA comprises a field used in the SNAP header.

11. The method as claimed in claim 3, wherein the STA comprises a field used in a Ethernet type.

12. A base station in a wireless radio access network, the radio access network comprising a radio network layer and a transport network layer, the base station comprising:
a hardware process module configured to execute an application process in the radio network layer to generate a radio datagram, wherein the hardware process module is configured to encapsulate the radio datagram in a payload of a second datagram, wherein the second datagram has a header and the payload, wherein the header has a first tier address (FTA) and a second tier address (STA), and wherein the STA identifies the application process and is used only within the radio network layer;
a host switch configured to receive the second datagram from the hardware process module, and switch the second datagram to a point of attachment (PoA) based on the FTA, wherein the PoA is part of a terrestrial transport network, and wherein an addressing scheme of the terrestrial transport network is independent of the STA.

13. The base station as claimed in 12, wherein the host switch is configured to receive a third datagram from the PoA, wherein the third datagram has the FTA and the STA, and wherein the host switch is configured to forward the third datagram to the hardware process module based on the FTA, and wherein the hardware process module is configured to steer the third datagram to the application process based on the STA.

14. The base station as claimed in claim 12, wherein the second datagram is an Ethernet packet.

15. The base station as claimed in claim 14, wherein the STA is provisioned through a connection-oriented approach.

16. The base station as claimed in claim 14, wherein the STA includes a VLAN tag, and wherein the STA comprises a field in the VLAN tag.

17. The base station as claimed in claim 14, wherein the STA includes a SNAP header and wherein the STA comprises a field in the SNAP header.

18. The base station as claimed in claim 14, wherein the STA comprises a field used in a Ethernet type.

19. A method, comprising:
a communication device receiving a wireless communication from a base station, wherein the base station comprises:
a hardware process module configured to execute an application process in a radio network layer to generate a radio datagram, wherein the hardware process module is configured to encapsulate the radio datagram in a payload of a second radio datagram, wherein the second radio datagram has a header and the payload, wherein the header has a first tier address (FTA) and a second tier address (STA), and wherein the STA identifies the application process and is used only within the radio network layer; and
a host switch configured to receive the second radio datagram from the hardware process module, and switch the second radio datagram to a point of attachment (PoA) based on the FTA, wherein the PoA is part of a terrestrial transport network, and wherein an addressing scheme of the terrestrial transport network is independent of the STA.

* * * * *